May 27, 1924.
A. F. WESTLUND ET AL
1,495,941
LIQUID-FLOW INDICATOR
Filed Feb. 1, 1922
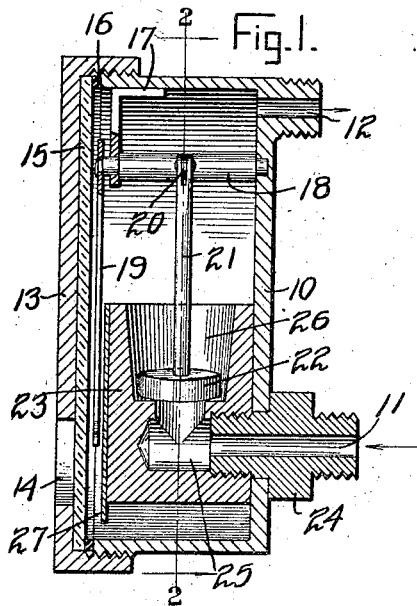
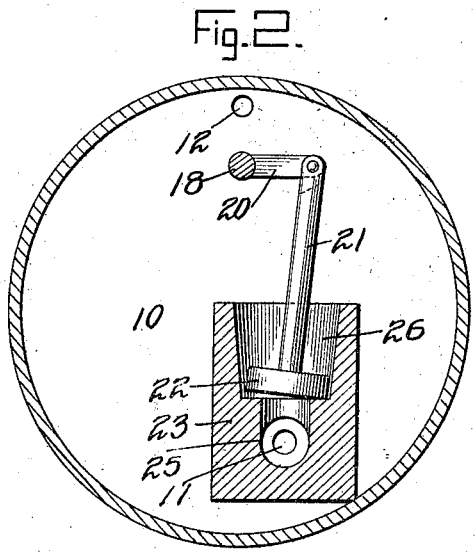
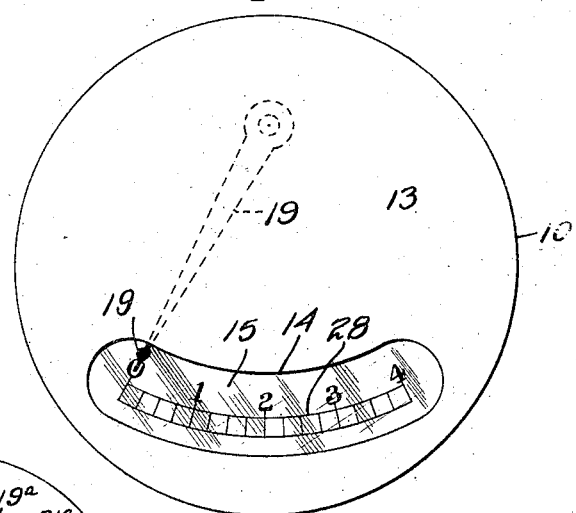
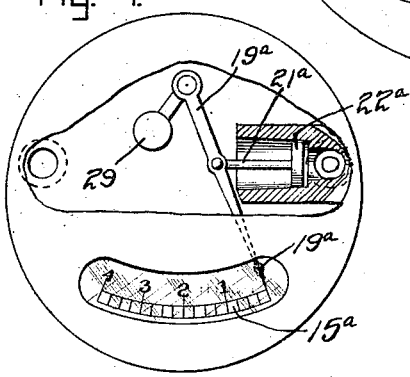
Inventors
Albert F. Westlund
Oramel H. Skinner
By ℰ. ℳ. Bedford
Attorney Patented May 27, 1924.

1,495,941

UNITED STATES PATENT OFFICE.

ALBERT F. WESTLUND AND ORAMEL H. SKINNER, OF INDIANAPOLIS, INDIANA.

LIQUID-FLOW INDICATOR.

Application filed February 1, 1922. Serial No. 533,461.

*To all whom it may concern:*

Be it known that we, ALBERT F. WESTLUND and ORAMEL H. SKINNER, citizens of the United States, residing at Indianapolis, in the county of Marion and State of Indiana, have invented certain new and useful Improvements in Liquid-Flow Indicators, of which the following is a specification.

Our said invention relates to a flow meter and it is an object thereof to provide an improved device of this character which shall be useful for indicating the rate of flow of fluids of various sorts whether liquid or gas.

Referring to the accompanying drawings, which are made a part hereof and on which similar reference characters indicate similar parts, Figure 1 is a central longitudinal section of our device, Figure 2 a transverse vertical section on line 2—2 of Figure 1.

Figure 3 a face view of the device, and

Figure 4 a face view of a modified form, a part of the casing being broken away to show the internal construction.

In the drawings 10 indicates a main outer casing having passages at 11 and 12 for inflow and outflow of fluid. The main casing is closed by a cover 13 here shown as having threaded connection with the main casing. The cover has an arcuate opening at 14 near its lower edge and this is covered by a transparent plate 15 extending over the casing 10 and separated therefrom by a packing 16. At its upper end the casing carries a bracket 17 which supports one end of a rock shaft 18, the other end being supported in a bearing on the casing. At its forward end the rock shaft carries a hand or indicating device 19. The rock shaft is actuated by an arm 20 carrying a rod 21 which at its lower end bears a plunger 22.

Cooperating with the plunger is a hollow block 23 acting as a cylinder but providing a considerable and varying clearance therefor. The block is supported by means of a nipple 24 extending through the wall of the casing and having threaded engagement with the cylinder. The passage 11 leads through the nipple and into a chamber 25 in the cylinder. This chamber communicates with a substantially frusto-conical chamber 26 at the upper end of the cylinder. On the front of the block there is located a plate 27 carrying a scale 28 with which the hand 19 coacts.

In operation a fluid enters the casing through the passage 11 and passes up through chambers 25 and 26. In doing so it raises the piston to an extent determined by the rate of flow. Such movement rocks the shaft 18 and causes the hand 19 to travel over the scale and give an indication of the rate of flow. The chamber 26 is flared out at the sides in the form shown to permit the fluid to pass by and to cause the movement of the piston to vary uniformly according to the rate of flow. The weight of the piston is such as normally to hold it close to the bottom of the chamber 26. In some cases, as where the position of the device is such that gravity would not hold the plunger in the proper position, a spring may be used and the plunger made lighter.

Figure 4 shows a modification of our device in which the chamber for the piston 22$^a$ extends horizontally. The piston rod 21$^a$ is pivoted directly to the hand 19$^a$ which coacts with a scale 15$^a$ as in Figure 3. In this modification the weight of the piston cannot be relied on to hold it in normal position at the bottom of the chamber and we have therefore provided a weight 29 on an arm extending at an angle to the hand, this weight being sufficiently heavy to hold the hand normally at the zero point on the scale. The operation of the device obviously will be substantially the same as in the modification previously described.

It will be evident to those skilled in the art that our device may be modified in various ways without departing from the spirit of our invention, as defined in the appended claims.

Having thus fully described our said invention, what we claim as new and desire to secure by Letters Patent, is:

1. In a flow meter, a casing comprising a cup-like body member open at one end, a transparent disk closing the open end of the casing, an apertured cover secured to the casing and holding said disk in place, a block in the casing having a flaring chamber with a flat bottom and a passage leading therethrough, a nipple extending through the casing and connecting with the passage in the block, a piston in the chamber having a flat face adapted to rest at times on the flat bottom thereof, and an indicator positioned within the casing so as to be viewed thru the aperture in the cover, and connections in the casing between said indicator and the piston, substantially as set forth.

2. In a flow meter, a closed casing comprising a cup-like body having inlet and outlet passages, a cover fastened thereon and having a sight opening, transparent means for closing said sight opening, a removable block at the rear of the sight opening having a passage communicating with the inlet opening, a dial on the block, a piston in the passage, an indicator between the sight aperture and the dial and connections in the casing from said piston to said indicator, substantially as set forth.

3. In a flow meter, a closed casing comprising a cup-like body member having inlet and outlet passages at one end thereof, a cover for the opposite end of the body and having a sight opening, transparent means for closing said sight opening, a block adjacent the inlet opening and having a passage in communication therewith, a piston in the last said passage, an indicator within the casing exposed to view thru the sight opening and connections in the casing from said piston to said indicator, substantially as set forth.

In witness whereof, we have hereunto set our hands and seals at Indianapolis, Indiana, this 26th day of January, A. D. nineteen hundred and twenty-two.

ALBERT F. WESTLUND. [L. S.]
ORAMEL H. SKINNER. [L. S.]

Witnesses:
M. L. SHULER,
CAREY S. FRYE.